(12) United States Patent
Shuntich

(10) Patent No.: US 9,631,856 B2
(45) Date of Patent: Apr. 25, 2017

(54) ICE-ACCELERATOR AQUEOUS SOLUTION

(71) Applicant: Douglas Shuntich, Charlotte, NC (US)

(72) Inventor: Douglas Shuntich, Charlotte, NC (US)

(73) Assignee: Supercooler Technologies, Inc., Maitland, FL (US)

( * ) Notice: Subject to any disclaimer, the term of this patent is extended or adjusted under 35 U.S.C. 154(b) by 494 days.

(21) Appl. No.: 14/163,063

(22) Filed: Jan. 24, 2014

(65) Prior Publication Data

US 2014/0318158 A1   Oct. 30, 2014

Related U.S. Application Data

(60) Provisional application No. 61/849,412, filed on Jan. 28, 2013.

(51) Int. Cl.
*F25D 3/02* (2006.01)
*F25D 3/08* (2006.01)
*C09K 5/06* (2006.01)

(52) U.S. Cl.
CPC ............ *F25D 3/08* (2013.01); *C09K 5/066* (2013.01); *F25D 2303/081* (2013.01); *F25D 2303/085* (2013.01)

(58) Field of Classification Search
CPC ......... F25D 2303/085; F25D 2303/081; F25D 31/002; F25D 2303/084; F25D 2303/0841; C09K 5/066; C09K 5/063

(Continued)

(56) References Cited

U.S. PATENT DOCUMENTS

| 136,632 A | 3/1873 | Whipple |
| 714,415 A | 11/1902 | Trafford |

(Continued)

FOREIGN PATENT DOCUMENTS

| KR | 1020080088944 | 10/2008 |
| KR | 1020100018887 | 2/2010 |

OTHER PUBLICATIONS

Shuntich, Supercooler Technologies, Inc., PCT Application No. PCT/US2015/034418 filed Jun. 5, 2005, Notification of Transmittal of the International Search Report and the Written Opinion of the International Searching Authority, or the Declaration mailed Sep. 14, 2015, 15 pages.

(Continued)

*Primary Examiner* — Cassey D Bauer
(74) *Attorney, Agent, or Firm* — Brian S. Steinberger; Law Offices of Brian S. Steinberger, P.A.

(57) ABSTRACT

Methods, processes, compositions, apparatus, kits and systems for chilling and cooling beverages and desserts to selected desired temperatures by adding the beverages and desserts to different mixtures of brine solutions and bags of loose ice. The invention forms and creates an aqueous solution composition of certain salinity of ice-melter (such as sodium chloride 'salt' and/or calcium chloride). The composition is poured in a pre-defined amount evenly over a known amount of bagged-ice in a cooler. The result is a precisely controlled and evenly distributed temperature (within a few degrees Fahrenheit) can be obtained within the ice-solution mixture. Next, canned and bottled beverages (and other items) can be submerged in the precision controlled temperature ice-solution mixture to create certain desired effects only possible by chilling items to a known temperature below 32 degrees.

18 Claims, 6 Drawing Sheets

(58) Field of Classification Search
USPC .......................................................... 62/76
See application file for complete search history.

(56) References Cited

U.S. PATENT DOCUMENTS

| | | | |
|---|---|---|---|
| 1,827,856 A | 10/1931 | Pope | |
| 1,854,731 A | 4/1932 | Beran | |
| 1,984,047 A | 12/1934 | Thieme | |
| 2,061,427 A | 11/1936 | King | |
| 2,073,176 A | 3/1937 | Quinn | |
| 2,094,774 A | 10/1937 | Dawson | |
| 2,289,645 A | 7/1942 | Geistert | |
| 2,314,586 A | 3/1943 | Levison | |
| 2,405,091 A | 7/1946 | Culbreth | |
| 2,446,614 A | 8/1948 | Sherick | |
| 2,629,229 A | 2/1953 | Hull | |
| 2,764,489 A | 9/1956 | Veazey | |
| 2,990,624 A | 7/1961 | Granath | |
| 3,065,553 A | 11/1962 | Olin | |
| 3,284,991 A | 11/1966 | Ploeger | |
| 3,434,410 A | 3/1969 | Galle | |
| 3,453,083 A | 7/1969 | Beerli | |
| 3,718,485 A | 2/1973 | Lankford | |
| 3,813,928 A | 6/1974 | Anderson | |
| 3,860,166 A | 1/1975 | Anderson | |
| 3,915,285 A | 10/1975 | Lindquist | |
| 3,987,211 A | 10/1976 | Dunn | |
| 4,164,851 A | 8/1979 | Bryant | |
| 4,172,365 A | 10/1979 | McClintock | |
| 4,493,156 A | 1/1985 | Siegmann | |
| 4,549,409 A | 10/1985 | Smith | |
| 4,580,405 A | 4/1986 | Cretzmeyer | |
| 4,736,600 A | 4/1988 | Brown | |
| 4,825,665 A | 5/1989 | Micallef | |
| 4,979,994 A | 12/1990 | Dussault | |
| 5,269,156 A | 12/1993 | Van De Velde | |
| 5,282,368 A | 2/1994 | Ordoukhanian | |
| 5,477,623 A | 12/1995 | Tomizawa | |
| 5,505,054 A | 4/1996 | Loibl | |
| 5,653,123 A | 8/1997 | Handlin | |
| 5,695,795 A | 12/1997 | Murray | |
| 5,939,120 A | 8/1999 | Bogue | |
| 5,966,964 A | 10/1999 | Pattee | |
| 6,116,042 A * | 9/2000 | Purdum | F25D 3/06 62/371 |
| 6,314,751 B1 | 11/2001 | Gjersvik | |
| 6,413,444 B1 | 7/2002 | Kasza | |
| 6,543,154 B2 | 4/2003 | Horigane | |
| 6,662,574 B2 | 12/2003 | Loibl | |
| 6,691,530 B2 | 2/2004 | Lee | |
| 6,730,341 B2 | 5/2004 | Ludwig | |
| 6,945,069 B2 | 9/2005 | Lee | |
| 7,707,848 B2 | 5/2010 | Loibl | |
| 7,712,321 B2 | 5/2010 | Kadyk | |
| 7,874,167 B2 | 1/2011 | Kammer | |
| 8,132,960 B2 | 3/2012 | Zhuang | |
| 8,549,993 B2 | 10/2013 | Foster | |
| 9,024,168 B2 | 5/2015 | Peterson | |
| 2002/0124576 A1 | 9/2002 | Loibl | |
| 2003/0192435 A1 | 10/2003 | McNair | |
| 2004/0103552 A1 | 6/2004 | Rhon | |
| 2004/0112413 A1 | 6/2004 | Brunner | |
| 2005/0142268 A1 | 6/2005 | Scullion | |
| 2005/0166768 A1 | 8/2005 | Porat | |
| 2006/0191086 A1 | 8/2006 | Mourad | |
| 2006/0225439 A1 * | 10/2006 | Morris, III | A22C 21/00 62/64 |
| 2007/0137223 A1 * | 6/2007 | Brekke | A23L 3/362 62/64 |
| 2008/0134695 A1 | 6/2008 | Loibl | |
| 2008/0141701 A1 | 6/2008 | Lewis | |
| 2008/0196443 A1 * | 8/2008 | Footer | F25D 3/08 62/457.5 |
| 2011/0308264 A1 | 12/2011 | Youn | |
| 2012/0106130 A1 | 5/2012 | Beaudetter | |
| 2013/0160987 A1 | 6/2013 | Grigorian | |
| 2013/0180280 A1 | 7/2013 | Grigorian | |
| 2014/0125577 A1 | 5/2014 | Hoang | |
| 2015/0112451 A1 | 4/2015 | Dechev | |

OTHER PUBLICATIONS

Ultrasonic Degassing and Defoaming of Liquids, Hielscher—Ultrasound Technology, 2015, 5 pages.
Shuntich, D.J., PCT Serial No. PCT/US14/47214, International Search Report and Written Opinion, mailed Nov. 20, 2014, 18 pages.
Shields, New Refrigeration Tech Cools Drink in 45 Seconds, Food & Drink International, 2014, www.fdiforum.net, 3 pages.

* cited by examiner

STEP 1

STEP 2

STEP 3

STEP 4

STEP 1

STEP 2

STEP 3

STEP 4

STEP 1

STEP 2

STEP 3

STEP 4

STEP 1

STEP 2

STEP 3

STEP 4

STEP 1

STEP 2

STEP 3

STEP 4

ICE-ACCELERATOR AQUEOUS SOLUTION

This application claims the benefit of priority to U.S. Provisional Patent Application Ser. No. 61/849,412 filed Jan. 28, 2013, which is incorporated by reference in its' entirety.

FIELD OF INVENTION

This invention relates to cooling and chilling beverages, desserts, food items and in particular to methods, processes, compositions, apparatus, kits and systems for chilling and cooling beverages, desserts and food items to selected desired temperatures by adding different mixtures of salt and calcium solutions and bags of loose ice.

BACKGROUND AND PRIOR ART

Packaged-ice, such as different weights of bagged ice has been popular to be used in portable coolers to chill canned and bottled beverages. Packaged-ice has generally become standardized over the past decades with a few popular sizes in the U.S. and around the world dominating the sales. For example, the 10 lb bag of packaged-ice is the most popular retail version of packaged-ice in the U.S., followed in descending popularity by 20 lb, 8 lb, 7 lb and 5 lb bags of packaged-ice.

In Canada, the United Kingdom (UK), and other European countries, other standard sizes such as but not limited to 6 lb (2.7 kg), and 26.5 lb (12 kg) are also very popular forms of packaged-ice.

The bags of packaged-ice generally comprise loose ice cubes, chips and the like, that are frozen fresh water. The standard use of the bags of ice is having the consumer place the bag(s) loosely in cooler containers, and then adding canned and/or bottled beverages, such as sodas, waters to the coolers containing the packaged-ice.

Due to the melting properties of the fresh-water ice, canned and bottled beverages placed in ice cannot be chilled below 32 degrees Fahrenheit for any significant length of time, which is the known general freezing point.

Over the years the addition of ice-melters such as salt have been known to be used to lower the melting point of fresh-water ice. Forms of using salt have included sprinkling loose salt on packed-ice in a cooler to produce lower temperatures for certain canned and bottled beverages placed inside. Sprinkling salt has been tried with beer, since beer will not freeze at 32 degrees due to its alcohol content. However, the use of sprinkling loose salt has problems.

Due to the uneven spread of salt on ice, it is impossible to know or control precisely the resulting temperate below 32 degrees on various ice-cubes in the cooler obtained by sprinkling of salt. Salt sprinkling has inevitably resulted in some of the beverages "freezing hard" while others remain liquid and sometimes at temperatures above 32 degrees. As such, the spreading of salt or other ice-melters on packaged-ice in a cooler to obtain colder temperatures than 32 degrees is an impractical method to know and control precisely the resulting temperature of ice-cubes in a cooler environment.

Thus, the need exists for solutions to the above problems with the prior art.

SUMMARY OF THE INVENTION

A primary objective of the present invention is to provide methods, processes, compositions, apparatus, kits and systems for chilling and cooling beverages, desserts and food items to selected desired temperatures by adding the items to different mixtures of brine solutions and bags of loose ice.

A secondary objective of the present invention is to provide methods, processes, compositions, apparatus, kits and systems for evenly chilling and cooling beverages, desserts and food items by submersing the items in an aqueous selected salinity of an ice-melter mixture, such as sodium chloride 'salt' and/or calcium chloride, that is combined with loose ice.

A third objective of the present invention is to provide methods, processes, compositions, apparatus, kits and systems for evenly chilling and cooling alcoholic and non-alcoholic beverages to desired temperatures below freezing by using preselected aqueous salinity solutions of an ice-melter mixture, combined with loose ice.

A fourth objective of the present invention is to provide methods, processes, compositions, apparatus, kits and systems for evenly chilling and cooling desserts by using preselected aqueous salinity solutions of an ice-melter mixture, combined with loose ice.

A fifth objective of the present invention is to provide methods, processes, compositions, apparatus, kits and systems for rapidly chilling beverages, desserts and food items by reducing chill time from hours to minutes.

A sixth objective of the present invention is to provide methods, processes, compositions, apparatus, kits and systems for keeping beverages, foods and desserts chilled for extended lengths of time (greater than approximately 12 to approximately 24 hours) without using an external power supply source such as electricity or fuel, below freezing. The extended periods of time are beneficial for transporting food, dessert and beverage items that take along time to transport.

A seventh objective of the present invention is to provide methods, processes, compositions, apparatus, kits and systems, to be used in the creation of homemade and/or chef created ice creams or frozen desserts that require precision temperature control during freezing.

Novel aqueous solutions of a selected salinity of ice-melter (such as sodium chloride 'salt' and/or calcium chloride) can be poured in a pre-defined amount evenly over a known amount of bagged-ice in a cooler, creating a precisely controlled and evenly distributed temperature (within a few degrees Fahrenheit) can be obtained within the ice-solution mixture. Canned and bottled beverages (and other items) can be submerged in the precision controlled temperature ice-solution mixture to create certain desired effects only possible by chilling items to a known temperature below 32 degrees.

This aqueous solution can be sold in packages, such as but not limited to bottles, and the like, clearly delineated to be used with standardized amounts of packaged-ice in the U.S. and abroad, and in a variety of mixtures to obtain certain precision temperature ranges to create desired cooling effects on beer, beverages, ice-creams, and more.

Further objects and advantages of this invention will be apparent from the following detailed description of the presently preferred embodiments which are illustrated schematically in the accompanying drawings.

DESCRIPTION OF THE PREFERRED EMBODIMENTS

Figure 1:
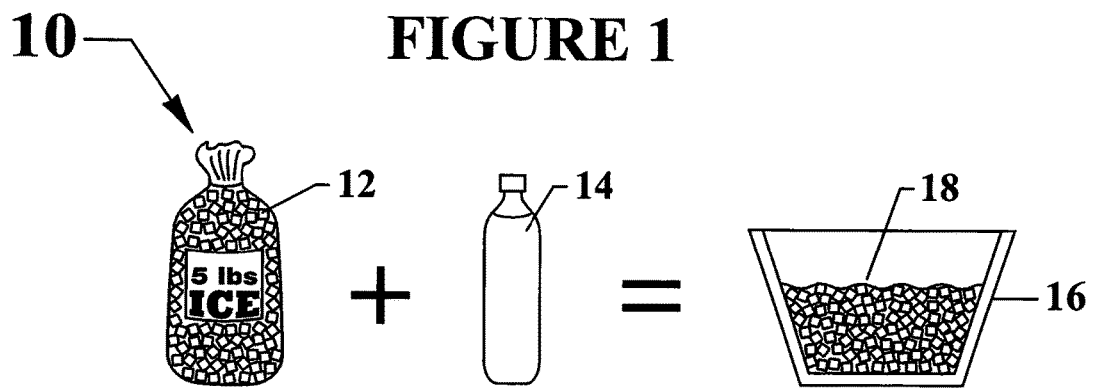
FIG. 1 shows an embodiment of a 5 lb ice bag of loose ice and 1 liter aqueous solution and cooler with SWIM mix.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.
10. 5 lb bag of loose ice
12. loose ice in the bag
14. 1 liter container of saline solution composition
16. cooler housing
18. SWIM mix
19. products to be cooled/chilled
20. 7 lb or 8 lb bag of loose ice
24. 1.5 liter container of saline solution composition
26. cooler housing
28. SWIM mix
29. products to be cooled/chilled
30. 10 lb bag of loose ice
34. 1.75 liter container of the saline solution composition
36. cooler housing
38. SWIM mix
39. products to be cooled/chilled The invention can utilize bottled, and optionally uniquely colored aqueous solutions made of varying salinities of Sodium Chloride (NaCl) or Sea Salt at specific salinities (e.g. 120-160 ‰, 180-220 ‰, 230-270 ‰, 280-320 ‰, 330-360 ‰ and others), where ‰ refers to grams per liter of water, or to grams per kilograms of water (g/kg of water).

The aqueous solutions can be contained in bottles of selected quantities (e.g. 1-liter, 1.5-liter, 1.75-liter, 2-liter, and other quantities) for the purpose of being poured over specific quantities of loose ice (5 lbs, 7 lbs, 8 lbs, 10 lbs, and other quantities, from typical bag sizes) in a typical portable beverage cooler to create a Solution-Water-Ice Mix (SWIM) within a specific temperature range below the freezing point of water (32 deg F.).

The active temperature lowering ingredient in the solution is a salt, such as but not limited to Sodium Chloride (NaCl) or Sea Salt and the like. Additionally, a catalyst agent, such as but not limited to Calcium (Ca), Calcium Citrate Ca3 (C6HSO7)2, and/or other forms of Calcium can be included in the solution for reducing the aggressive corrosive characteristics of the Sodium Chloride on bare metals, leathers, and other substances.

Optional buffering additives, can also be used in the solution, such as but not limited to vegetable derivatives, such as vegetable glycerin or vegetable glycerol, food coloring, propylene glycol, flavorings, sweeteners, and the like, and any combinations thereof.

In addition, an optional deterrent additive(s) such as but not limited to Alum, extract of Lemon, orange, lime, and other strong citrus or pepper, or bitter cherries, and the like, and any combination thereof, can be added to act as a pet and child deterrent and safety agent in order to prevent ingestion of significant quantities which may prove harmful in selected applications for children, elderly, pets, and the like.

Tables 1-5 show the components of the novel aqueous solutions and their component ranges and amounts for Solution-Water-Ice Mix (SWIM) used in coolers. Each table can represent a bottled aqueous solution.

TABLE 1

SWIM TEMPERATURE Approx. 22 F. to Approx. 24 F.
Values in grams per kilograms of water

| Component | Broad Range | Narrow Range | Prefer. Amnt |
|---|---|---|---|
| Salt | Approx 40 to Approx. 80 | Approx. 120 to Approx 160 | Approx. 140 |
| Calcium | Approx 1 to Approx. 40 | Approx. 5 to Approx. 10 | Approx. 7.5 |
| Buffer Additive | 0 to Approx. 100 | 0 to Approx. 60 | 0 to Approx. 50 |
| Deterrent Additive | 0 to Approx. 20 | 0 to Approx. 10 | 0 to Approx. 7.5 |

TABLE 2

SWIM TEMPERATURE Approx. 18 F. to Approx. 21 F.
Values in grams per kilograms of water

| Component | Broad Range | Narrow Range | Prefer. Amnt |
|---|---|---|---|
| Salt | Approx 60 to Approx. 240 | Approx. 180 to Approx 220 | Approx. 200 |
| Calcium | Approx 1 to Approx. 40 | Approx. 5 to Approx. 15 | Approx. 10 |
| Buffer Additive | 0 to Approx. 100 | 0 to Approx. 80 | 0 to Approx. 60 |
| Deterrent Additive | 0 to Approx. 20 | 0 to Approx. 10 | 0 to Approx. 7.5 |

TABLE 3

SWIM TEMPERATURE Approx. 15 F. to Approx. 18 F.
Values in grams per kilograms of water

| Component | Broad Range | Narrow Range | Prefer. Amnt |
|---|---|---|---|
| Salt | Approx 60 to Approx. 290 | Approx. 230 to Approx 270 | Approx. 250 |
| Calcium | Approx 1 to Approx. 60 | Approx 10 to Approx. 20 | Approx. 15 |
| Buffer Additive | 0 to Approx. 100 | 0 to Approx. 80 | 0 to Approx. 70 |
| Deterrent Additive | 0 to Approx. 20 | 0 to Approx. 10 | 0 to Approx. 7.5 |

TABLE 4

SWIM TEMPERATURE Approx. 10 F. to Approx. 13 F.
Values in grams per kilograms of water

| Component | Broad Range | Narrow Range | Prefer. Amnt |
|---|---|---|---|
| Salt | Approx 60 to Approx. 340 | Approx. 280 to Approx 320 | Approx. 300 |
| Calcium | Approx 1 to Approx. 80 | Approx 10 to Approx. 30 | Approx. 20 |
| Buffer Additive | 0 to Approx. 120 | 0 to Approx. 90 | 0 to Approx. 80 |
| Deterrent Additive | 0 to Approx. 20 | 0 to Approx. 10 | 0 to Approx. 7.5 |

TABLE 5

SWIM TEMPERATURE Approx. 6 F. to Approx. 9 F.
Values in grams per kilograms of water

| Component | Broad Range | Narrow Range | Prefer. Amnt |
|---|---|---|---|
| Salt | Approx 60 to Approx. 360 | Approx. 330 to Approx 360 | Approx. 345 |
| Calcium | Approx 1 to Approx. 100 | Approx 10 to Approx. 40 | Approx. 25 |
| Buffer Additive | 0 to Approx. 140 | 0 to Approx. 100 | 0 to Approx. 90 |
| Deterrent Additive | 0 to Approx. 20 | 0 to Approx. 10 | 0 to Approx. 7.5 |

The specific SWIM temperatures allow certain desirable effects to be achieved on beverages, beer, ice-creams, smoothies, milkshake, popsicles, and cold treat emulsifiers (such as but not limited to FROSTIES® and SLURPEES®) placed in the SWIM that are impossible to achieve using ice alone or by mixing fresh water with ice in a cooler.

Effects such as 1) chilling beer to near its freezing point, 2) supercooling bottled or canned beverages, 3) creating frozen popsicles and supercooling popsicles, 4) keeping soft-serve and store bought ice-creams in perfect emulsions, and other effects require specific temperatures that are below the melting point of fresh-water ice (32 deg F.). Most of these effects require temperatures between 5 deg F. and 24 deg F., which can be achieved in a SWIM using specific salinities and volumes of Brine-Solution when mixed with standardized bags of ice.

Assuming consumers mainly utilize quanta of standardized bagged ice in their portable coolers (5 lbs, 7 lbs, 8 lbs, or 10 lbs), certain volumes of the novel aqueous solution work best in saturating these standard amounts of ice. See FIGS. 1-3.

Assuming most consumers will immediately pour the room temperature aqueous solution over the ice, the variable that determines the initial temperature of the SWIM is the salinity of the Brine.

The novel aqueous solutions can also be color coded according to salinity, which is directly related to the resultant SWIM temperature and possible effects. The following TABLE 6 shows how the color code may be used to identify differing salinities of bottled aqueous solutions.

TABLE 6

COLOR CODE CHART

| COLOR | SWIM TEMP. (F.) | SALINITY SOLUTION | PRODUCT APPLICATION |
|---|---|---|---|
| BLUE | 6-9° | 330-360‰ | Ice Creams |
| GREEN | 10-13° | 280-320‰ | Supercooling drinks rapidly |
| YELLOW | 15-18° | 230-270‰ | Supercooling drinks |
| ORANGE | 18-21° | 180-220‰ | Soft Serve Ice Cream |
| RED | 22-24° | 120-160‰ | Beer Chilling |

The invention can pertain to the specific volumes, salinities, and color coding of the Solution. Blue can represent the coldest SWIM and has the highest salinity. Red can represent the warmest SWIM and the lowest salinity. Other colors, such as but not limited to clear, black, white, and other variations, can be used.

Specific volumes can be used for specific sized bagged ice; 1-liter for 5 lbs, 1.5-liter for 7-8 lbs, and 1.75-2 liter for 10 lbs. (See FIGS. 1-8.)

The invention can pertain to any volume(s) that when mixed exactly with certain standard quantities of bagged-ice will produce a usable SWIM for submerging and supercooling reasonable and expected amounts of canned or bottled beverages per amount of bagged-ice. For example; a 10 lb bag of ice plus certain volume of the novel aqueous solution should be expected to allow up to 6 12-oz cans to be submerged in the SWIM.

Several embodiments are described below for actual applications of the novel invention that can be used with portable coolers, such as Styrofoam coolers, plastic coolers, and aluminum or metal coolers.

FIG. 1 shows an embodiment of a 5 lb ice bag 10 holding loose ice 12 and 1 liter aqueous solution 14 with a cooler 16 containing the Solution-Water-Ice Mix (SWIM) 18 having a specific temperature range below the freezing point of water (32 deg F.).

Figure 2:
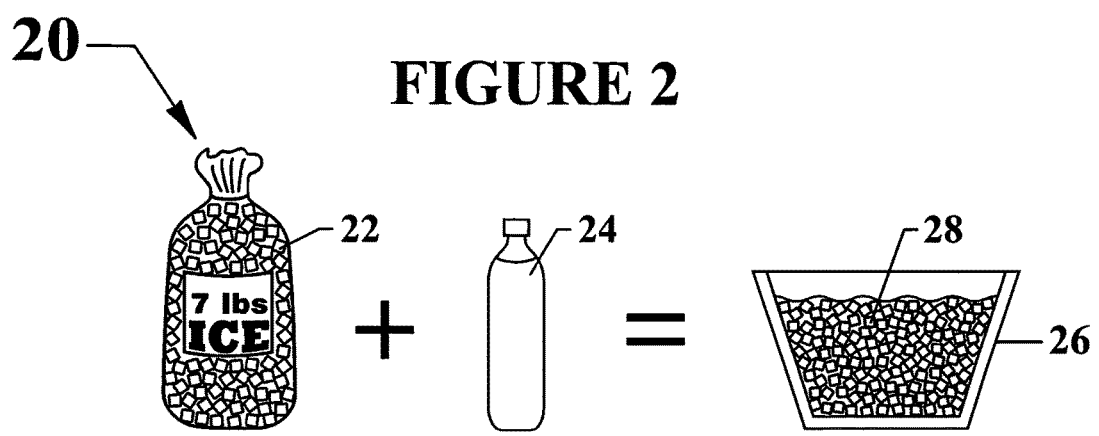
FIG. 2 shows an embodiment of a 7/8 lb ice bag of loose ice and 1.5 liter aqueous solution and cooler of SWIM mix.

FIG. 2 shows an embodiment of a 7 or 8 lb ice bag 20 holding loose ice 22 and 1.5 liter aqueous solution 24 with a cooler 26 containing the Solution-Water-Ice Mix (SWIM) 28 having a specific temperature range below the freezing point of water (32 deg F.).

Figure 3:
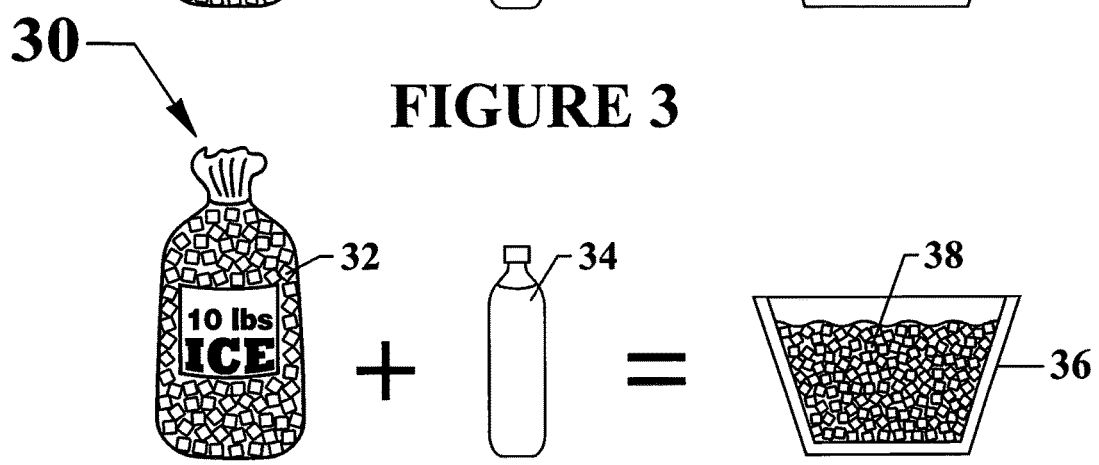
FIG. 3 shows an embodiment of a 10 lb ice bag of loose ice and 1.75 liter aqueous solution and cooler of SWIM mix.

FIG. 3 shows an embodiment of a 10 lb ice bag 30 holding loose ice 32 and 1.75 liter aqueous solution 34 with a cooler 36 containing the Solution-Water-Ice Mix (SWIM) 38 having a specific temperature range below the freezing point of water (32 deg F.).

Figure 4:
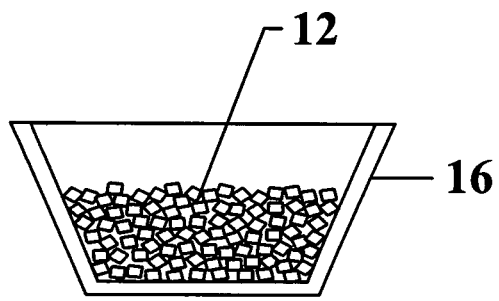
FIG. 4 shows the four steps of using the embodiment of FIG. 1 for a 5 lb ice bag and 1 liter aqueous solution with a cooler container.
Figure 4:
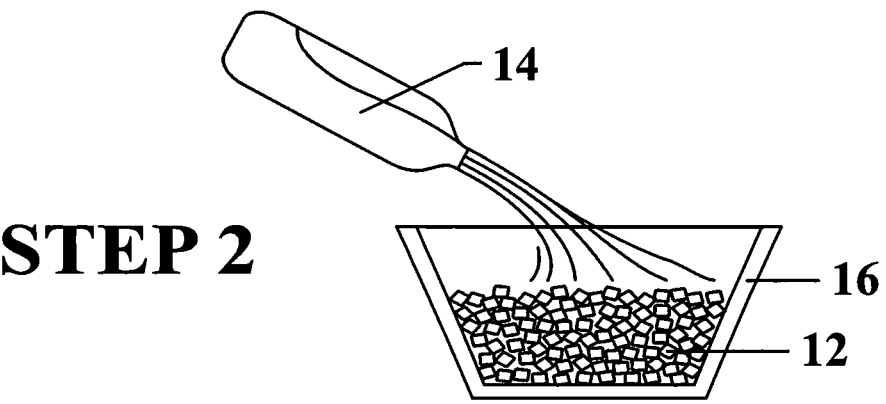
Figure 4:
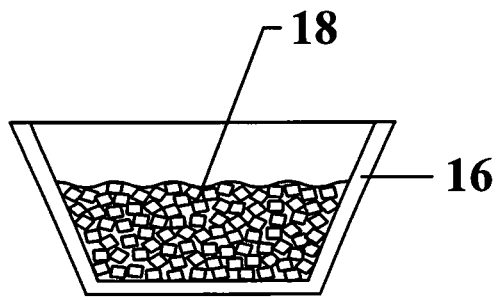
Figure 4:
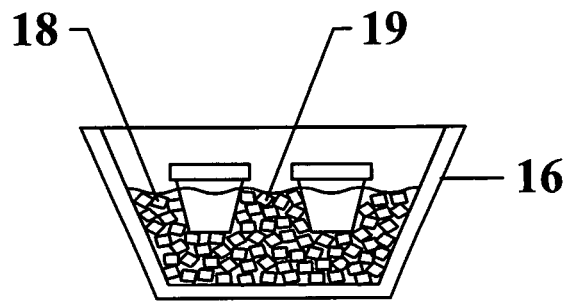

FIG. 4 shows the four steps of using the embodiment of FIG. 1 for a 5 lb ice bag 10 and 1 liter aqueous solution 14 with a cooler container 16. Step 1 has the cooler container 16 holding loose ice 12. Step 2 has the aqueous solution from 1 liter container 14 being poured over the ice 12 in the container 16. Solution in container 16 having a salinity of 350 ‰, where a Blue Colored Aqueous Solution container 16 can be used here.

Step 3 has the cooler 16 with Solution-Water-Ice Mix (SWIM) 18 inside having temperature of approximately 6 F to approximately 9 F. Step 4 has the product 19, such as ice cream containers submersed in the SWIM 18, being used to keep the store bought ice cream in a perfect emulsion for outdoor settings.

Specific useful temperature ranges in the SWIM can be expected to last 8 hours in a cooler per 10 lb bag of ice and 1.75 liters of solution. The temperature ranges of the SWIM can last within indoor and outdoor environments having temperatures of approximately 65 F to approximately 85 F.

Products such as store bought ice cream (in pint, quart, ½ gallon sizes, and the like) can stay at approximately 6 to approximately 9 F in a soft emulsion state perfect for consumption (though not in a soft serve state). The state can be between a not melted state and a not frozen hard state. The products that as store bought ice cream can be kept in a consistent emulsion state in most outdoor temperature settings between approximately 60 F to approximately 90 F for approximately 8 to approximately 12 hours or longer depending on the type of cooler and amount of ice used with the aqueous solution.

Figure 5:
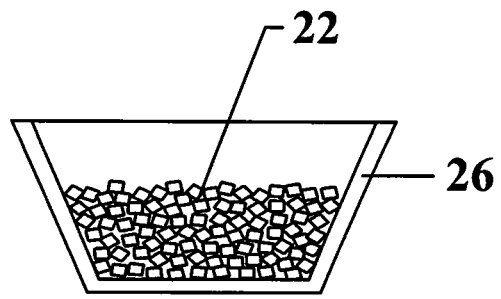
FIG. 5 shows the four steps of using the embodiment of FIG. 2 for a 7 or 8 lb ice bag and 1.5 liter aqueous solution with a cooler container.
Figure 5:
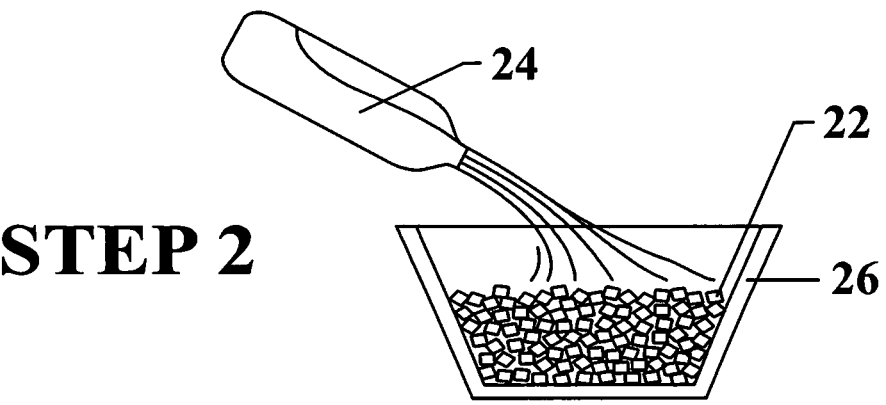
Figure 5:
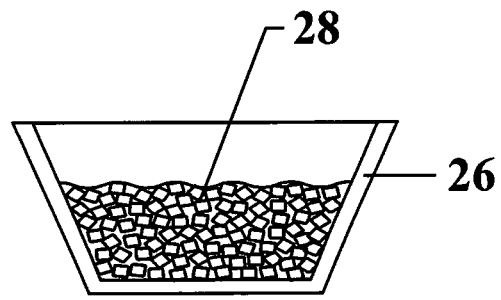
Figure 5:
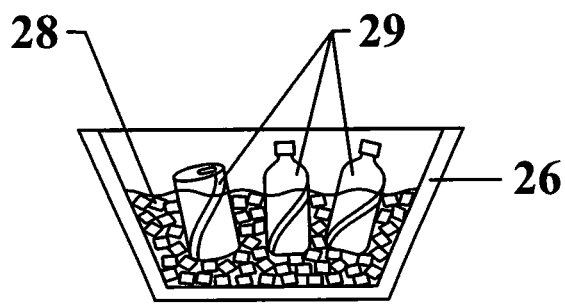

FIG. 5 shows the four steps of using the embodiment of FIG. 2 for a 7 or 8 lb ice bag 20 and 1.5 liter aqueous solution 24 with a cooler container 26. Step 1 has the cooler container 26 holding loose ice 22. Step 2 has the aqueous solution from 1.5 liter container 24 being poured over the ice 22 in the container 26. Solution in container 26 having a salinity of 250 ‰, where an Yellow Colored Aqueous Solution container 26 can be used here.

Step 3 has the cooler 26 with Solution-Water-Ice Mix (SWIM) 28 inside having temperature of approximately 15 F to approximately 18 F. Step 4 has the product(s) 29, such as canned and bottled beverages submersed in the SWIM 28, being used to keep the store bought beverages in a super cooled liquid state for outdoor settings where a variety of the canned and bottled beverages are supercooled but not allowed to freeze hard due to the consistent temperature of the SWIM.

The super cooled beverages can then be 'slushed' (nucleated) on demand by either striking the container with a hand or against an object such as a table with mild force or by placing a small crystal of ice into the supercooled beverage. The resulting slush is soft and easily consumed with or without a straw as nearly half of the beverage remains in a liquid state. This effect allows the beverage to maintain a preferred cold temperature (scientifically referred to as a 'frigorific' temperature) for several minutes after the initial slushing effect.

The super cooled state for beverages submerged in the SWIM will last for 8 to 12 hours or more in a single 10 lb package of ice with one 1.75 liter aqueous ice-accelerator solution in outdoor settings. The supercooled beverages remain at a temperature below freezing without freezing hard.

Figure 6:
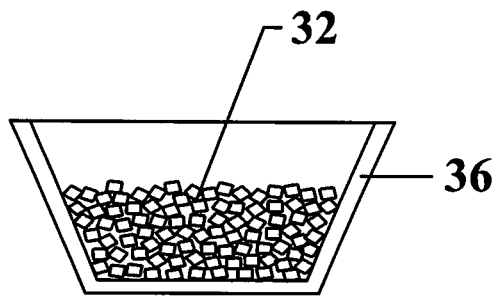
FIG. 6 shows the four steps of using the embodiment of FIG. 3 for a 10 lb ice bag and 1.75 liter aqueous solution with a cooler container.
Figure 6:
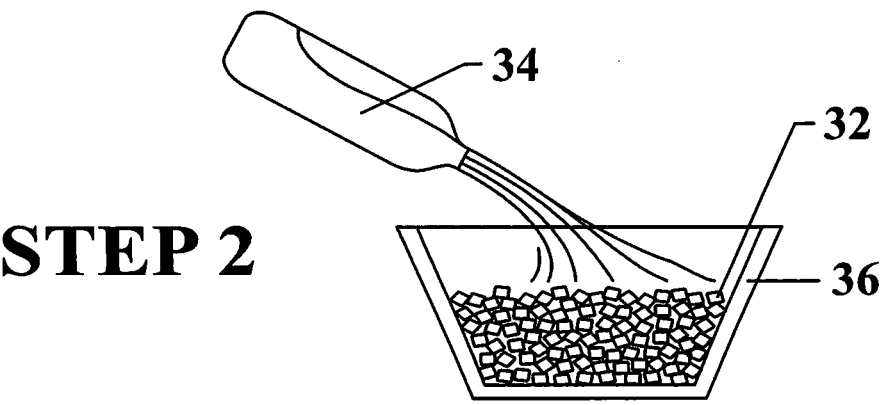
Figure 6:
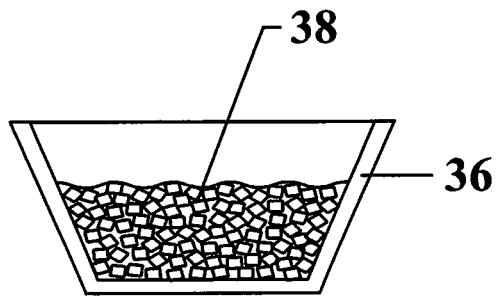
Figure 6:
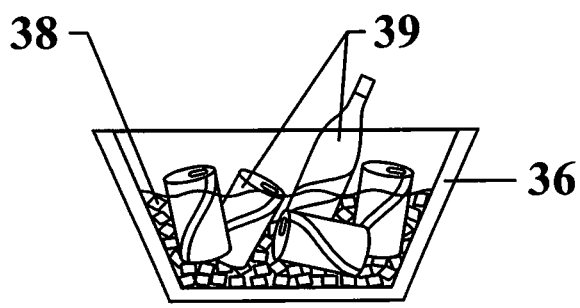

FIG. 6 shows the four steps of using the embodiment of FIG. 3 for a 10 lb ice bag 30 and 1.75 liter aqueous solution 34 with a cooler container 36. Step 1 has the cooler container 36 holding loose ice 32. Step 2 has the aqueous solution from 1.75 liter container 34 being poured over the ice 32 in the container 36. Solution in container 36 having a salinity of 250 ‰, where a Red Colored Aqueous Solution container 34 can be used here. Step 3 has the cooler 36 with Solution-Water-Ice Mix (SWIM) 38 inside having temperature of approximately 15 F to approximately 18 F. Step 4 has the product(s) 39, such as canned and bottled beer submersed in the SWIM 38, being used to keep the store bought beer 39 for chilling the beer to its freezing point but not allowing the beer to freeze.

The chilled beer (or other beverages) submerged in the SWIM will remain at optimal temperatures for 8 to 12 hours or more in a single 10 lb package of ice with one 1.75 liter aqueous ice-accelerator solution in outdoor settings. The beer will remain in a liquid state near or slightly below (or above) it's freezing point without freezing hard, and at up to 10 degrees below the freezing point of water (32 F). This temperature provides an optimal crispness and flavor as well as allowing the beverage to remain colder, longer during consumption. The temperatures of 22 F to 24 F are not generally low enough to cause the beer to 'slush' (nucleate) when opened, thereby providing the lowest possible liquid drinking temperatures for beer.

Figure 7:
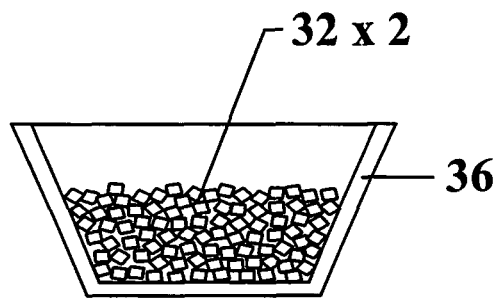
FIG. 7 shows the four steps of using the embodiment of FIG. 3 for using 2 10 lb ice bags and 2 1.75 liters aqueous solution with a cooler container.
Figure 7:
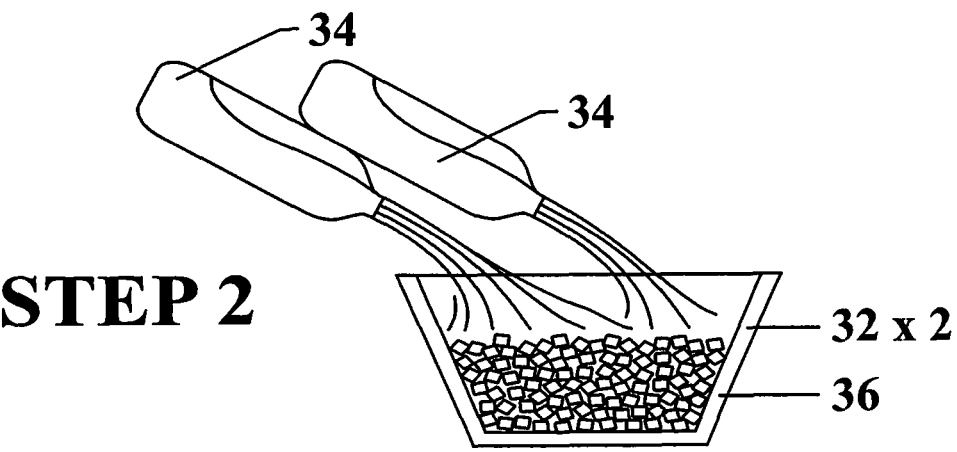
Figure 7:
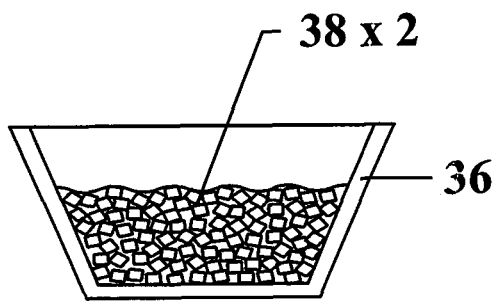
Figure 7:
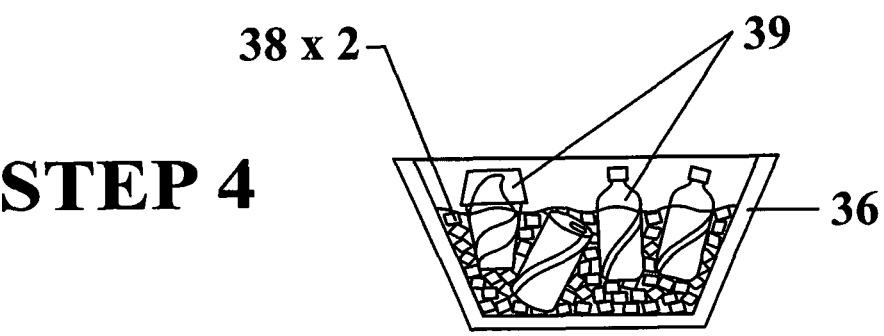

FIG. 7 shows the four steps of using the embodiment of FIG. 3 for using 2 10 lb ice bags 32 and 2 1.75 liters 34 aqueous solution with a cooler container 36. Step 1 has the cooler container 36 holding loose ice 32 from 2 10 lb bags 30. Step 2 has the aqueous solution from 2 1.75 liter containers 34 being poured over the ice 32 in the container 36. Solution in containers 34 can have a salinity of 200 ‰, where an Orange Colored Aqueous Solution container can be used here.

Step 3 has the cooler 36 with Solution-Water-Ice Mix (SWIM) 38(×2) at temperatures between 18 to 21 F. Step 4 has the product(s) 39, such as soft serve ice cream in packages submersed in the SWIM 38, being used to keep the soft serve ice cream in a consistent emulsion state at temperatures between 18 to 21 F, and for supercooling beverages.

The super cooled beverages can then be 'slushed' (nucleated) on demand by either striking the container with a hand or against an object such as a table with mild force or by placing a small crystal of ice into the supercooled beverage. The resulting slush is soft and easily consumed with or without a straw as nearly half of the beverage remains in a liquid state. This effect allows the beverage to maintain a preferred cold temperature (scientifically referred to as a 'frigorific' temperature) for several minutes after the initial slushing effect.

The supercooled state for beverages submerged in the SWIM will last for 8 to 12 hours or more in a single 10 lb package of ice with one 1.75 liter aqueous ice-accelerator solution in outdoor settings. The supercooled beverages remain at a temperature below freezing without freezing hard. Soft-serve ice-creams such as those provided by Dairy Queen® and other ice-cream or custard stores generally require a temperature between 18 F and 21 F to maintain their soft emulsion, whereas store-bought container ice-cream will melt to liquid at these temperatures and therefore require the 6 F to 9 F temperature ice-accelerator to maintain their textures.

Figure 8:
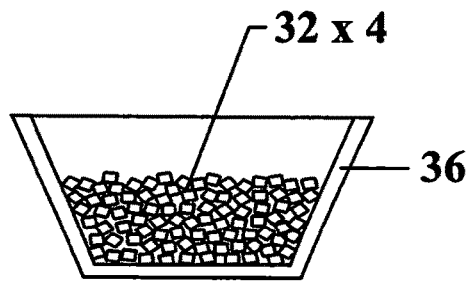
FIG. 8 shows the four steps of using the embodiment of FIG. 3 for using 4 10 lb ice bags and 4 1.75 liters aqueous solution with a cooler container.
Figure 8:
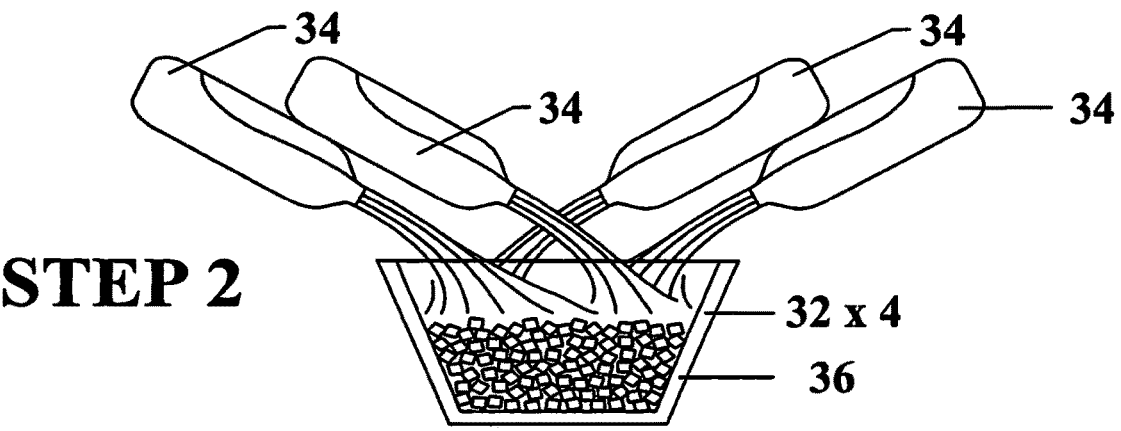
Figure 8:
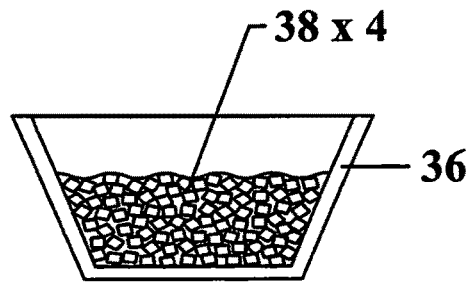
Figure 8:
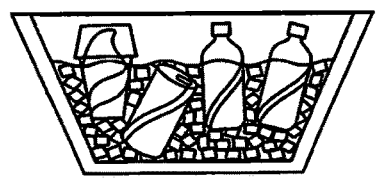

FIG. 8 shows the four steps of using the embodiment of FIG. 3 for using 4 10 lb ice bags 30 and 4 1.75 liters 34 aqueous solution with a cooler container 36.

Step 1 has the cooler container 36 holding loose ice 32 from 4 10 lb bags 30. Step 2 has the aqueous solution from 4 1.75 liter containers 34 being poured over the ice 32 in the container 36. Solution in containers 34 can have a salinity of 200 ‰, where an Green Colored Aqueous Solution container can be used here.

Step 3 has the cooler 36 with Solution-Water-Ice Mix (SWIM) 38(×4) at temperatures between 10 to 13 F. Step 4 has the product(s) 39, such as store bought ice cream, gelatos, popsicles (frozen or unfrozen) submersed in the SWIM 38, for supercooling beverages rapidly. Supercooling can take approximately 20 to approximately 60 minutes with the invention, and can be reduced further to approximately 5 minutes or less by article devices such as a spinning device, and the like. A timer can be used to prevent freezing. The timer can calculate time based on the SWIM temperature, size of the beverage container(s) and starting temperature(s) of the beverage container(s).

The term "approximately" or "approx." can include +/−10 percent of the number adjacent to the term.

Although the invention references desserts such as ice-cream, other types of edible foods can be used, such as but not limited frozen yogurt, sorbet, sherbet, ice milk, smoothies, milk shakes, and the like, which prevents melting or hard freezing of the foods. Other types of foods can be used with the invention, such as but not limited to fish, meat, poultry, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A method of pre-chilling and cooling beverages and dessert to selected temperatures, comprising the steps of
providing a cooler;
providing selected amounts of loose ice for insertion into the cooler;
providing products selected from at least one of pre-packaged beverages and pre-packaged desserts;
submersing the products in the cooler with the loose ice;
forming a selected amount of an aqueous ice-melter composition having a selected salinity;
pouring the aqueous ice-melter composition into the cooler over the submersed products in the loose ice; and
cooling and chilling the products in the cooler to selected temperatures below approximately 32 F,
wherein the step of providing selected amounts of loose ice includes the step of:
providing at least one bag of the loose ice, the bags being selected from at least one of 5 pound bag, 7 pound bag, 8 pound bag, 10 pound bag, and,
wherein the step of forming the selected amount of the aqueous ice-melter composition includes the step of:
forming a one liter container of the aqueous ice-melter composition for the 5 pound bag of the loose ice.

2. A method of pre-chilling and cooling beverages and dessert to selected temperatures, comprising the steps of
providing a cooler;
providing selected amounts of loose ice for insertion into the cooler;
providing products selected from at least one of pre-packaged beverages and pre-packaged desserts;
submersing the products in the cooler with the loose ice;
forming a selected amount of an aqueous ice-melter composition having a selected salinity;
pouring the aqueous ice-melter composition into the cooler over the submersed products in the loose ice; and
cooling and chilling the products in the cooler to selected temperatures below approximately 32 F,
wherein the step of providing selected amounts of loose ice includes the step of:
providing at least one bag of the loose ice, the bags being selected from at least one of 5 pound bag, 7 pound bag, 8 pound bag, 10 pound bag, and
wherein the step of forming the selected amount of the aqueous ice-melter composition includes the step of:
forming a one and a half liter container of the aqueous ice-melter composition for the 7 or 8 pound bag of the loose ice.

3. A method of pre-chilling and cooling beverages and dessert to selected temperatures, comprising the steps of
providing a cooler;
providing selected amounts of loose ice for insertion into the cooler;
providing products selected from at least one of pre-packaged beverages and pre-packaged desserts;
submersing the products in the cooler with the loose ice;
forming a selected amount of an aqueous ice-melter composition having a selected salinity;
pouring the aqueous ice-melter composition into the cooler over the submersed products in the loose ice; and
cooling and chilling the products in the cooler to selected temperatures below approximately 32 F,
wherein the step of providing selected amounts of loose ice includes the step of:
providing at least one bag of the loose ice, the bags being selected from at least one of 5 pound bag, 7 pound bag, 8 pound bag, 10 pound bag, and
wherein the step of forming the selected amount of the aqueous ice-melter composition includes the step of:
forming a one and three quarter liter container of the aqueous ice-melter composition for the 10 pound bag of the loose ice.

4. A method of pre-chilling and cooling beverages and dessert to selected temperatures, comprising the steps of
providing a cooler;
providing selected amounts of loose ice for insertion into the cooler;
providing products selected from at least one of pre-packaged beverages and pre-packaged desserts;
submersing the products in the cooler with the loose ice;
forming a selected amount of an aqueous ice-melter composition having a selected salinity;
pouring the aqueous ice-melter composition into the cooler over the submersed products in the loose ice; and
cooling and chilling the products in the cooler to selected temperatures below approximately 32 F, and
wherein the step of forming the selected amount of the aqueous ice-melter composition includes the step of:
forming the aqueous ice-melter composition having the selected salinity from a mixture of salt and calcium.

5. The method of claim 4, further comprising the step of:
providing the salinity of the mixture to be approximately 120 ‰ to approximately 160 ‰.

6. The method of claim 4, further comprising the step of:
providing the salinity of the mixture to be approximately 180 ‰ to approximately 220 ‰.

7. The method of claim 4, further comprising the step of:
providing the salinity of the mixture to be approximately 230 ‰ to approximately 270 ‰.

8. The method of claim 4, further comprising the step of:
providing the salinity of the mixture to be approximately 280 ‰ to approximately 320 ‰.

9. The method of claim 4, further comprising the step of:
providing the salinity of the mixture to be approximately 330 ‰ to approximately 360 ‰.

10. An aqueous solution and ice water composition for cooling and chilling beverages and desserts to selected temperatures below approximately 32 f, comprising:

a mixture of salt and calcium having a selected salinity to form an aqueous solution;

a selected bag amount of loose ice combined with the aqueous solution to form a solution-water ice mix having a selected temperature, wherein the bag is selected from at least one of 5 pound bag, 7 pound bag, 8 pound bag, 10 pound bag, and wherein beverage and dessert products submersed in the solution-water ice mixture are cooled and chilled to below approximately 32 F; and a container for the mixture of the salt and the calcium, the container is selected from at least one liter container, one and a half liter container, one and three quarter liter container, and a two liter container.

11. The aqueous solution and ice water composition of claim 10, wherein the salinity of the solution is approximately 120 ‰ to approximately 160 ‰, and the temperature of the solution-water ice mix is approximately 22 F to approximately 24 F.

12. The aqueous solution and ice water composition of claim 10, wherein the salinity of the solution is approximately 180 ‰ to approximately 220 ‰, and the temperature of the solution-water ice mix is approximately 18 F to approximately 21 F.

13. The aqueous solution and ice water composition of claim 10, wherein the salinity of the solution is approximately 230 ‰ to approximately 270 ‰, and the temperature of the solution-water ice mix is approximately 15 F to approximately 18 F.

14. The aqueous solution and ice water composition of claim 10, wherein the salinity of the solution is approximately 280 ‰ to approximately 320 ‰, and the temperature of the solution-water ice mix is approximately 10 F to approximately 13 F.

15. The aqueous solution and ice water composition of claim 10, wherein the salinity of the solution is approximately 330 ‰ to approximately 360‰, and the temperature of the solution-water ice mix is approximately 6 F to approximately 9 F.

16. A portable beverage and dessert cooling system, comprising:

a bag of loose ice;

a portable cooler housing the loose ice from the bag, so that at least one product selected from at least one of a beverage and a dessert, allows for the product to be submersed in the loose ice within the cooler; and a container of an aqueous solution having a selected salinity, wherein the aqueous solution is poured from the container into the cooler adapted having the at least one product being submersed in the loose ice so that the product is chilled to a selected temperature less than approximately 32 F, and wherein the bag is selected from at least one of 5 pound bag, 7 pound bag, 8 pound bag, 10 pound bag.

17. A portable beverage and dessert cooling system, comprising:

a bag of loose ice;

a portable cooler housing the loose ice from the bag, so that at least one product selected from at least one of a beverage and a dessert, allows for the product to be submersed in the loose ice within the cooler; and a container of an aqueous solution having a selected salinity, wherein the aqueous solution is poured from the container into the cooler adapted having the at least one product being submersed in the loose ice so that the product is chilled to a selected temperature less than approximately 32 F, and wherein the container of the aqueous solution includes a selected amount of salt and calcium, and the container is selected from at least one liter container, one and a half liter container, one and three quarter liter container, and a two liter container.

18. The method of claim 4, wherein the products are selected from at least one liter container, one and a half liter container, one and three quarter liter container, and a two liter container.

\* \* \* \* \*